(12) United States Patent
Chuang et al.

(10) Patent No.: US 7,436,608 B2
(45) Date of Patent: Oct. 14, 2008

(54) FOCUSING MODULE

(76) Inventors: Yun Yu Chuang, 4F, No. 16, Alley 15, Lane 82, Da Yong Street, San Chong City (TW); Ming Hung Lin, 2F, No. 24, Lane 178, Li Shyng Road Section 1, San Chong City (TW)

( * ) Notice: Subject to any disclaimer, the term of this patent is extended or adjusted under 35 U.S.C. 154(b) by 49 days.

(21) Appl. No.: 11/516,482

(22) Filed: Sep. 7, 2006

(65) Prior Publication Data

US 2007/0171549 A1 Jul. 26, 2007

(30) Foreign Application Priority Data

Jan. 13, 2006 (TW) .............................. 95200833 U

(51) Int. Cl.
G02B 7/02 (2006.01)

(52) U.S. Cl. ...................................... 359/824; 359/811
(58) Field of Classification Search .................. 359/824
See application file for complete search history.

(56) References Cited

U.S. PATENT DOCUMENTS

2007/0154198 A1* 7/2007 Oh et al. ....................... 396/85

* cited by examiner

*Primary Examiner*—Jordan M. Schwartz
*Assistant Examiner*—James C Jones
(74) *Attorney, Agent, or Firm*—Rosenberg, Klein & Lee

(57) ABSTRACT

A focusing module includes a casing, at least one fixed magnetic element, a membrane, a movable magnetic element, and a lens. The fixed magnetic element is fixed in the casing for generating a first magnetic field. The membrane is received and retained in an upper section of the casing. The membrane defines a central hole. The movable magnetic element is attached to the membrane, surrounding the central hole of the membrane. The movable magnetic element receives a control signal and in response thereto generates a second magnetic field, which interacts with the first magnetic field of the fixed magnetic field to induce a force acting on the membrane to cause elastic deformation of the membrane. The lens is fixed to the central hole of the membrane whereby the lens is movable with respect to the casing due to the elastic deformation of the membrane caused by magnetic interaction between the first and second magnetic fields of the fixed and movable magnetic elements so as to effect focusing operation.

16 Claims, 8 Drawing Sheets

FOCUSING MODULE

BACKGROUND OF THE INVENTION

1. Field of the Invention

The present invention generally relates to a focusing module for small-sized electronic or digital imaging device, and in particular to a focusing device that operates on the movement of resilient membrane induced by magnetic forces to effect fine adjustment of focusing.

2. The Related Arts

Digital or electronic imaging devices, such as mobile phones, digital cameras, web cameras, pin-hole cameras, are widely used in a variety of applications. These imaging device effect focusing operation in digital focusing or optic focusing manner. The digital focusing is effected by data processing preformed by a digital image integrated circuit (IC). The advantage of the digital focusing is the reduction of number of optic elements and thus costs of manufacturing, as well as reduced overall size. However, digital focusing surfers image display delay and blurring and distortion of image. This is due to the data processing is very time consuming, and the result of processing often makes the image distorted, making it impossible to show the true image.

As to the optic focusing, an example is shown in Taiwan Utility Model Publication No. 588551, which illustrates an automatic focusing device, in which a movable lens holder and a casing of a digital camera engage each other with threadings. Electro-magnetic driving means having a construction similar to a motor is employed to rotate the lens for axially displacing the lens to effect focusing operation. The focusing operation of the conventional devices requires continuously rotating the lens, which may causes the lens to inadvertently separate from the holder or induces error of focusing due to the vibration or shaking of the lens caused by rotation thereof. Further, the threading and electromagnetic driving means cannot be modularized, which makes the focusing device very bulky and requiring a large-sized casing to accommodate the parts. Consequently, manufacturing process of digital camera gets complicated and manufacturing costs increased.

In addition, inertial force of the bulky and often heavy parts of the optic focusing device makes it difficult to control the operation thereof and delays the time interval that is required to move the lens to a desired position. The vibration or shaking caused by rotation of the lens ad the mechanical noise and vibration caused by the threading engagement also impose undesired error to the final result of image display, which is often overcome by employing additional vibration-absorbing device. This further increases the costs.

The present invention is made to overcome the drawbacks of the conventional focusing devices.

SUMMARY OF THE INVENTION

Thus, an object of the present invention is to provide a focusing module comprising a casing, a fixed magnetic element, a membrane, a movable magnetic element and a lens. The fixed magnetic element is fixed in a bottom inside the casing to provide a first magnetic field having upward-pointing magnetic force lines. The membrane is fixed in an upper section of the casing and forms a central hole. The movable magnetic element is attached to an underside of the membrane and surrounds the central hole to provide a second magnetic field having downward-pointing magnetic force lines. The lens is mounted to the central hole of the membrane. With the attraction or expelling between the first and second magnetic fields of the fixed and movable magnetic elements, the membrane, the movable magnetic element, and the lens are movable upward or downward with fine displacement along an axis of the fixed magnetic element and the membrane to effect focusing operation of the lens.

A second object of the present invention is to provide a focusing module wherein the fixed magnetic element and the movable magnetic element is controlled by the application of control signals to provide a uniform and steady magnetic field for moving the movable magnetic element in axially upward or downward direction with precisely controlled displacement.

A third embodiment of the present invention is to provide a focusing module wherein a casing is provided for accommodating the fixed magnetic element, the membrane, the movable magnetic element, and the lens to construct a simple, small-sized and low-cost modularized assembly for small-sized electronic imaging devices.

A further object of the present invention is to provide a focusing module wherein the lens and the movable magnetic element do not get physical engagement with the casing in both stationary condition or displacing axially so that no mechanical noise and vibration will be generated during the axial displacement of the lens.

A fifth object of the present invention is to provide a focusing module wherein the lens is axially displaced by means of elastic deformation of the membrane caused by the movement of the movable magnetic element and wherein, when either one of interacted magnetic fields is removed, the lens automatically returns to a home position by the resiliency of the membrane without additional power sources for that purpose.

To achieve the above objects, a focusing module in accordance with the present invention comprises a casing, at least one fixed magnetic element, a membrane, a movable magnetic element and a lens. The fixed magnetic element is fixed in a bottom inside the casing to provide a first magnetic field having upward-pointing magnetic force lines. The membrane is received and fixed in an upper section of the casing and forms a central hole. The movable magnetic element is attached to an underside of the membrane and surrounds the central hole to provide a second magnetic field having downward-pointing magnetic force lines. By applying a control signal to the fixed magnetic element or the movable magnetic element, an attractive or expelling interaction is induced between the first and second magnetic fields, which moves the membrane and the movable magnetic element upward or downward along a central axis of the fixed magnetic element, the membrane, and the movable magnetic element with fine displacement. The lens is mounted to the central hole of the membrane so as to be movable in unison with the membrane and the movable magnetic element to effect focusing operation of the lens in a noise-free, vibration-free and precise manner.

BRIEF DESCRIPTION OF THE DRAWINGS

In order to clearly show and make better comprehension of these and other features and advantages of the present invention, the present invention will now be described by way of examples, with reference to embodiments illustrated in the drawings, in which.

DETAILED DESCRIPTION OF THE PREFERRED EMBODIMENTS

Figure 1:
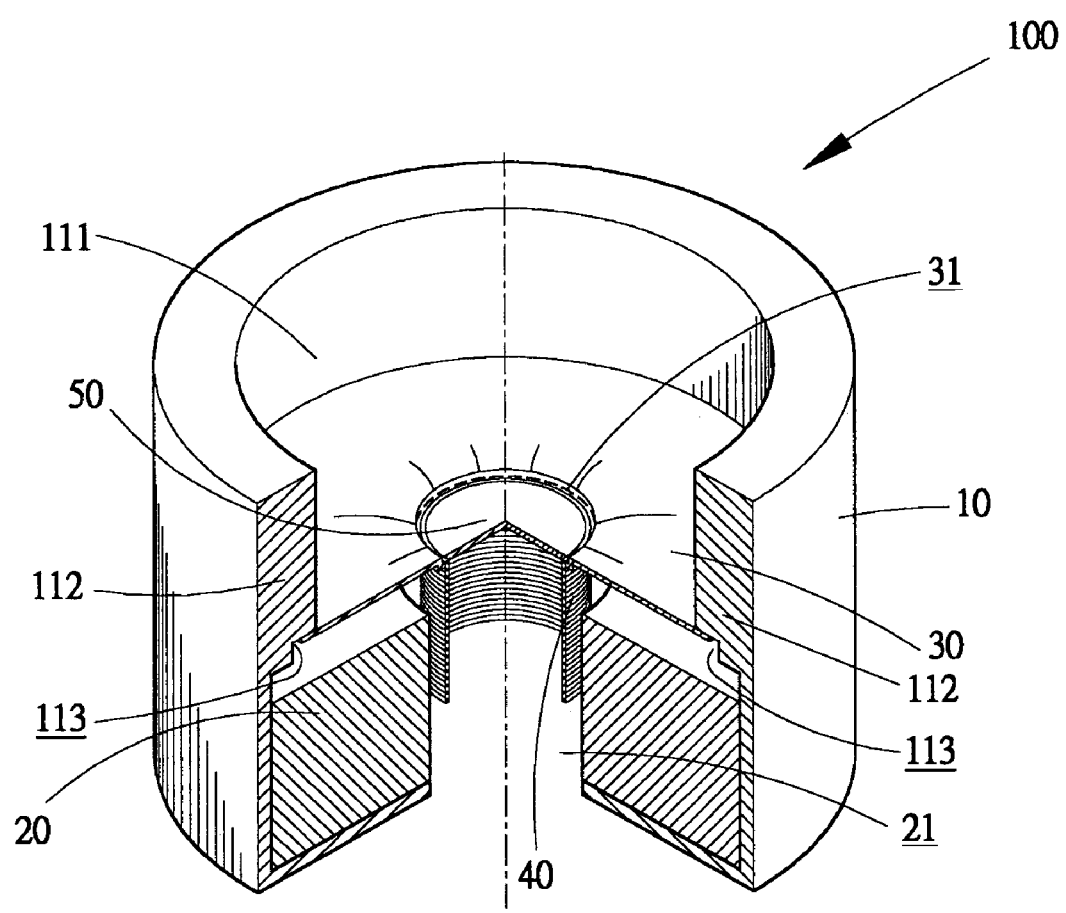
FIG. 1 shows a perspective view, partially broken, of a focusing module constructed in accordance with a first embodiment of the present invention.
Figure 2:
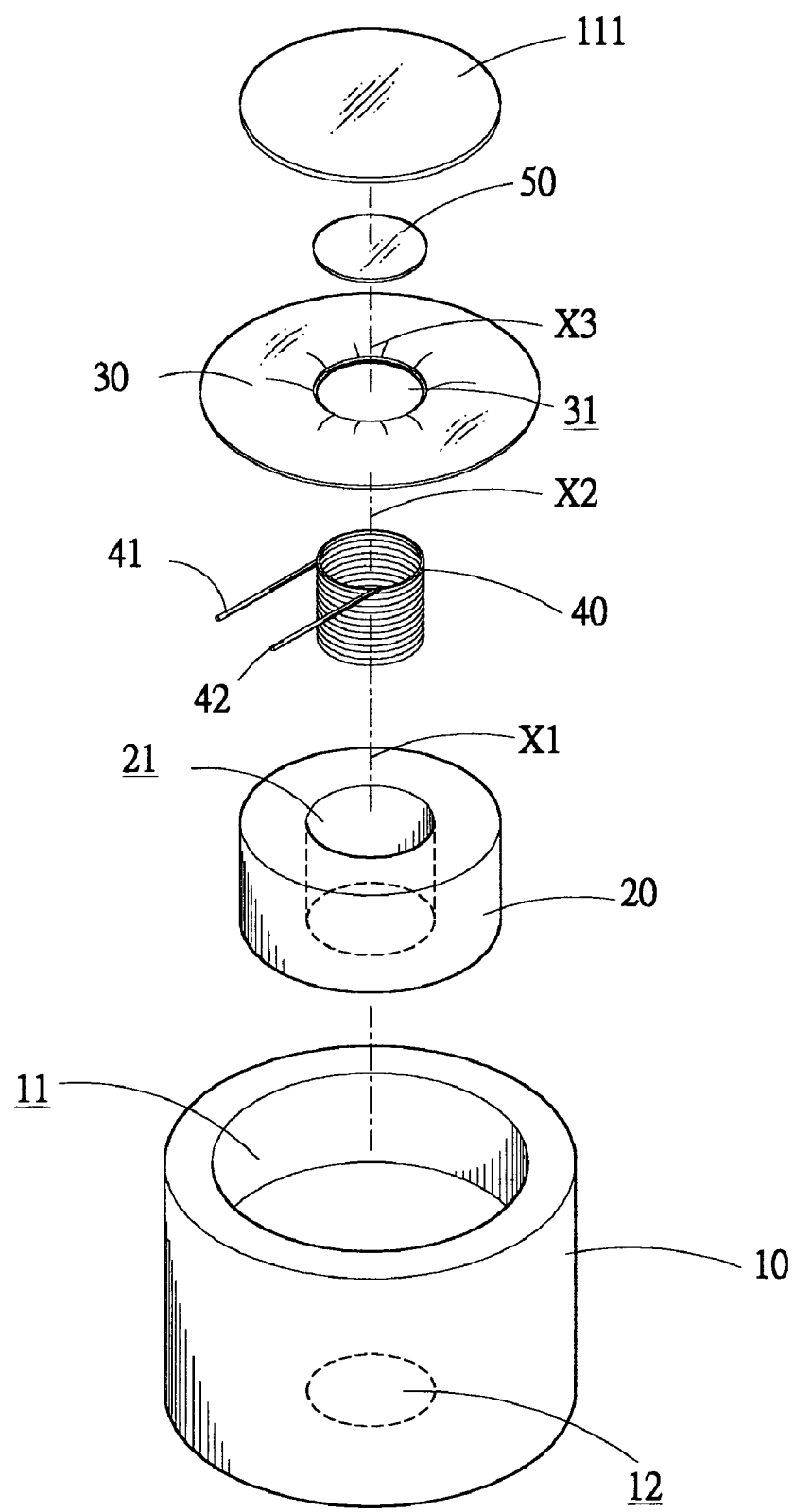
FIG. 2 shows an exploded view of FIG. 1.
Figure 3:
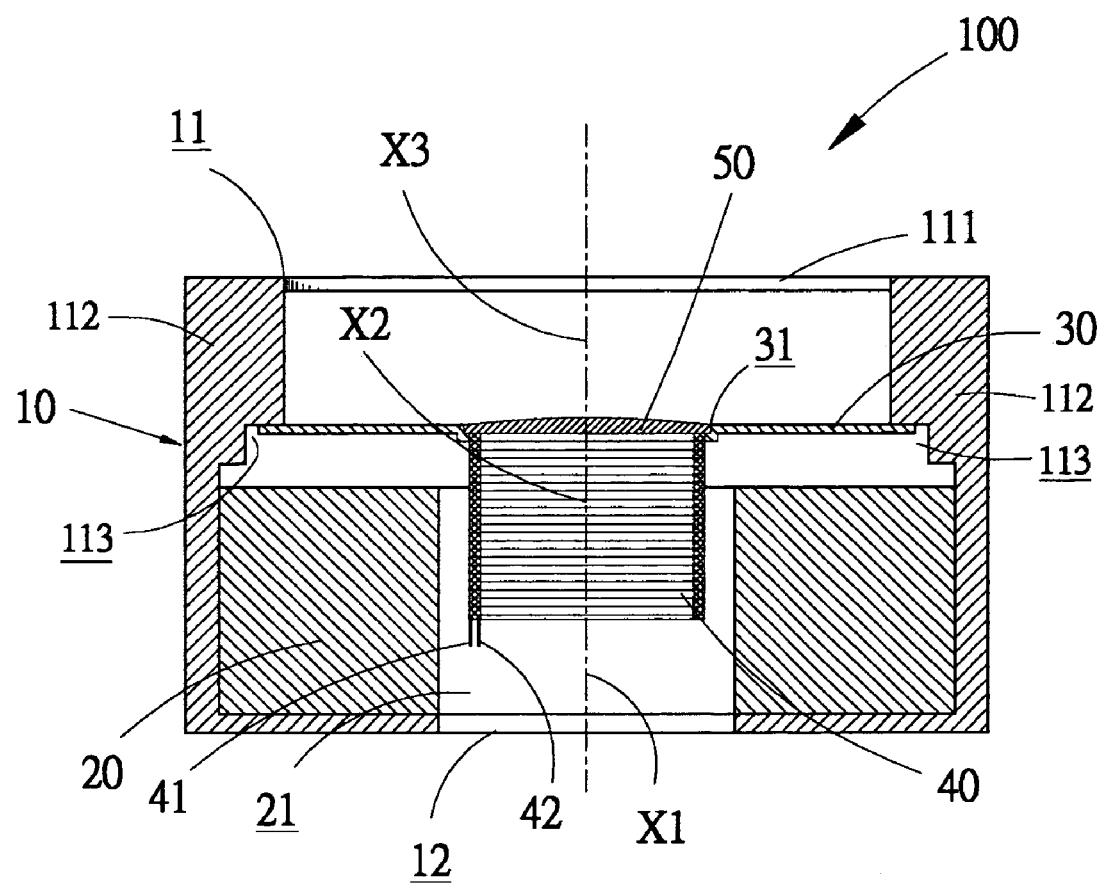
FIG. 3 shows a cross-sectional view of FIG. 1.

With reference to the drawings and in particular to FIGS. 1-3, a focusing module constructed in accordance with a first embodiment of the present invention, generally designated with reference numeral 100, comprises a casing 10, which in the embodiment illustrated is a hollow cylinder, but not limited thereto, at least one first magnetic element 20, a membrane 30, a second magnetic element 40, and a lens 50. The casing 10 defines a bore 11 having an opening to which a flat lens 111 is mounted, serving as an optic input port. The bore 11 is divided into an upper section 112 and a lower section (not labeled) and a shoulder, which forms a circumferential receiving slot 113, connects between the upper and lower sections. The lower section forms a bottom opening 12, serving as an optic output port.

The first magnetic element 20, which is a fixed magnetic element in the embodiment illustrated, is received ad fixed in the lower section of the casing 10, preferably at bottom of the casing 10. The fixed magnetic element 20 can be any type of magnet or magnetic field generation device, which in the embodiment illustrated comprises a ring magnet. The fixed magnetic element 20 generates a first magnetic field having magnetic force lines that point axially upward or downward. In the embodiment illustrated, the fixed magnetic element 20 generates a first magnetic field of which the magnetic force lines point axially downward. The fixed magnetic element 20 can be fixed in the casing 10 by any known means, such as adhesives, force fitting, threading. The fixed magnetic element 20 defines a central bore 21 extending along a central axis X1 of the fixed magnetic element 20.

Figure 4:
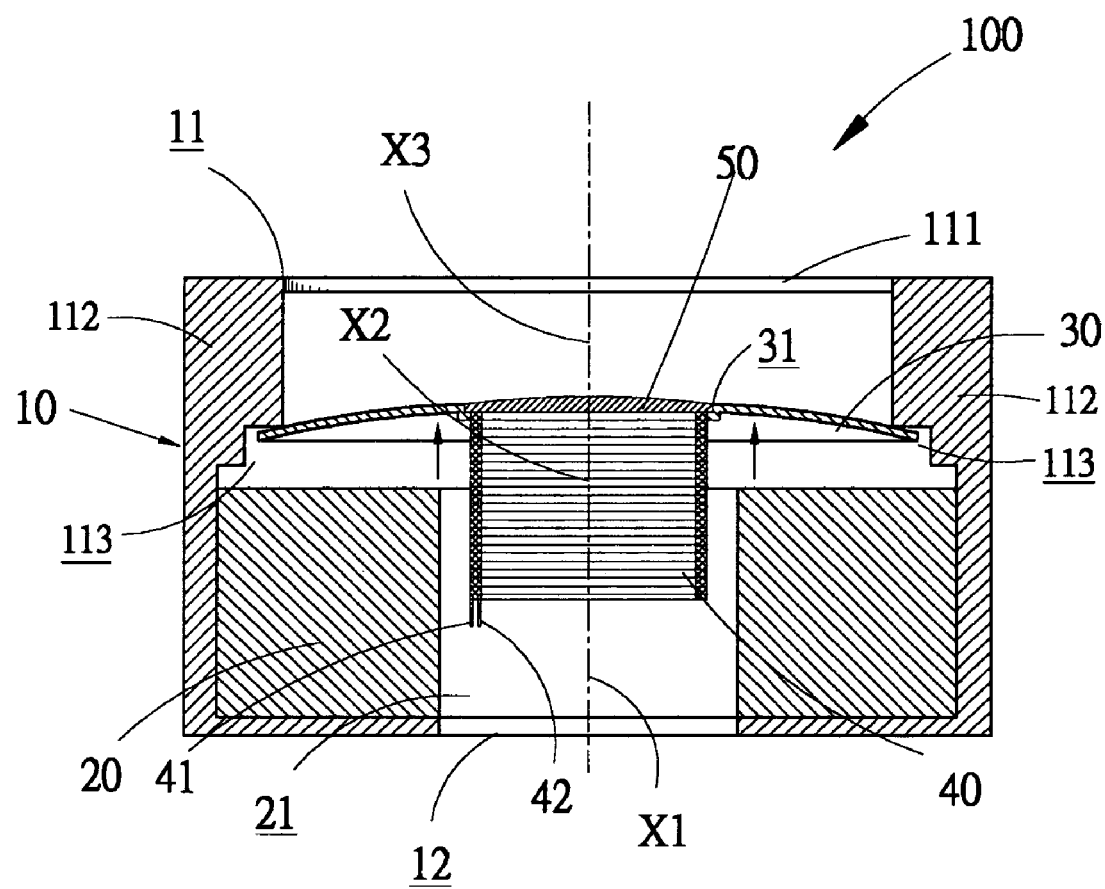
FIG. 4 is a cross-sectional view similar to FIG. 3 but showing a lens is moved upward for effecting focusing operation.

Also referring to FIG. 4, the membrane 30 is a ring-like member having an outer circumference received and fixed to the receiving slot 113 of the upper section 112 of the casing 10 so as to locate above the fixed magnetic element 20. The membrane 30 can be fixed to the casing 10 by any known means, such as adhesives, or other equivalent method, such as by a bolt. The membrane 30 has a central axis X2 that is coincident with the central axis X1 of the fixed magnetic element 20. The membrane 30 formed a central hole 31 centering at the axis X2. The membrane 30 can be made of any suitable material, including elastically deformable or resilient rubber or plastic film or membrane, as well as other deformable member having equivalent characteristics.

The second magnetic element 40 is attached to an underside of the membrane 30 and substantially concentric with the central hole 31, preferably surrounding and extending along a circumference of the central hole 31. The second magnetic element 40 can be of any types, which in the embodiment illustrated, comprises a coil that extends along the circumference of the central hole 31. The coil 40 has two terminals 41, 42 for receiving a control signal, such as an electrical control signal, to induce a second magnetic field having magnetic force lines pointing axially upward or downward. In the embodiment illustrated, the second magnetic field generated by the second magnetic element 40 has downward pointing magnetic force lines.

The second magnetic field that is generated by the second magnetic element 40 attached to the membrane 30 interacts with the first magnetic field generated by the fixed magnetic element 20, inducing an attraction force or expelling force therebetween, so that the second magnetic element 40 is attracted or expelled by the fixed magnetic element 20 to move toward or away from the fixed magnetic element 20. In this respect, the second magnetic element 40 serves as a movable magnetic element. The magnitude of the attraction force or expelling force between the magnetic elements 20, 40 is dependent upon the control signal applied to the terminals 41, 42 of the coil of the movable magnetic element 40. Also the attraction force or expelling force between the magnetic elements 20, 40, which causes movement of the movable magnetic element 40 with respect to the fixed magnetic element 20 that is fixed in the casing 10, also induce deformation of the membrane 30 in axially upward or downward direction along the central axis X2, as shown in FIG. 4.

Preferably, the central bore 21 of the fixed magnetic element 20 is large enough to movably receive at least a portion of the second magnetic element 40 therein with a circumferential space therebetween.

The lens 50 is mounted to the central hole 31 of the membrane 30 and is thus movable with the deformation of the membrane 30. An external image transmitting through the flat lens 50 is received by the lens 50 that has optic characteristics to guide and focus the image through the bottom opening 12 of the casing 10 to be received by an image detection device that will be further discussed. The movement of the movable magnetic element 40 causes the membrane 30 to deform, which in turn moves the lens 50 with respect to the casing 10 in the axially upward or downward direction to carry out fine focusing adjustment and thus realizing focusing operation that is conventionally performed in a digital camera or the likes.

The resiliency of the membrane 30 helps returning the membrane 30 and the lens 50 attached thereto to the home position where the membrane 30 is not deformed, after the control signal is no longer applied to the terminals 41, 42. No additional device, either mechanical or electrical, or component is needed for the home returning operation of the lens 50.

Figure 5:
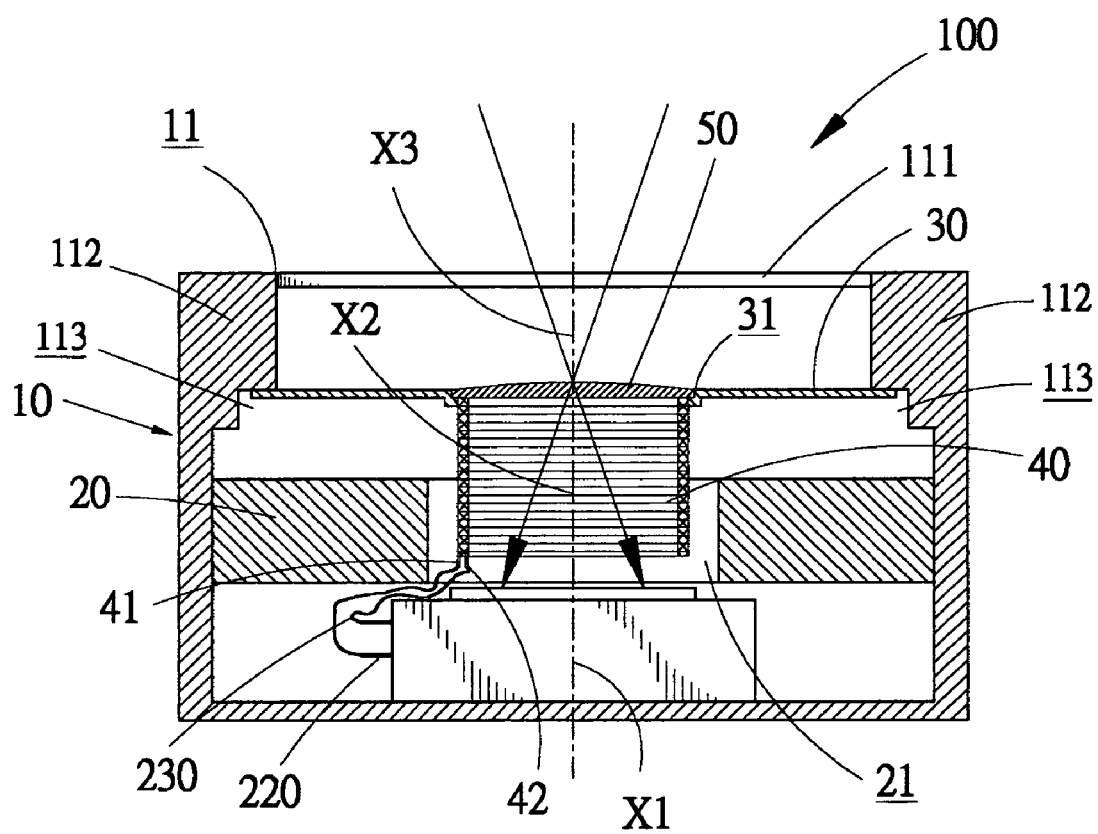
FIG. 5 is a cross-sectional view showing an application of the focusing module of the present invention in an imaging device.

Also referring to FIG. 5, a digital imaging device, such as a digital camera that embodies the focusing module 100 in accordance with the present invention is shown. Besides the digital camera, other digital imaging device, such as mobile phone with camera, web cam, and pin-hole camera, can also employed to embody the present invention.

As shown in FIG. 5, in steady of being mounted on the bottom of the casing 10, the fixed magnetic element 20 is spaced from the bottom of the casing 10 to leave a space for accommodating an image-taking integrated circuit (IC) 200, which receives an image transmitting through the lens 50. The fixed magnetic element 20 is thus fixed to side wall of the casing 10 spaced from the bottom. The fixed magnetic element 20 can be fixed to the casing 10 by any known means, such as adhesives and bolt or the likes. The image-taking IC 200 can be a known image processing device employed in a conventional digital camera, such as a CMOS image IC.

The image-taking IC 200 comprises an image forming section 210 and at least two control signal outputs 220, 230.

The image forming section 210 receives optic signal that is from the lens 50 and travels through the bore 21 of the fixed magnetic element 20 to form a corresponding image for the IC 200. The control signal outputs 220, 230 are coupled to the control terminals 41, 42 of the movable magnetic element 40 whereby, in accordance with the status of the image that the image forming section 210 receives from the lens 50, the image-taking IC 200 may apply suitable electric control signals to the movable magnetic element 40 via the outputs 220, 230 to induce attraction force or expelling force between the fixed magnetic element 20 and the movable magnetic element 40 for moving the lens 50 along the axes X2 and X3 and thus changing the focal length between the lens 50 and the image forming section 210 thereby effecting focusing operation. The circuit 200 is capable to do calculation and control of the focusing operation based on software or hardware that is well known in the art of camera focusing. No further detail in this regard will be given herein.

Figure 6:
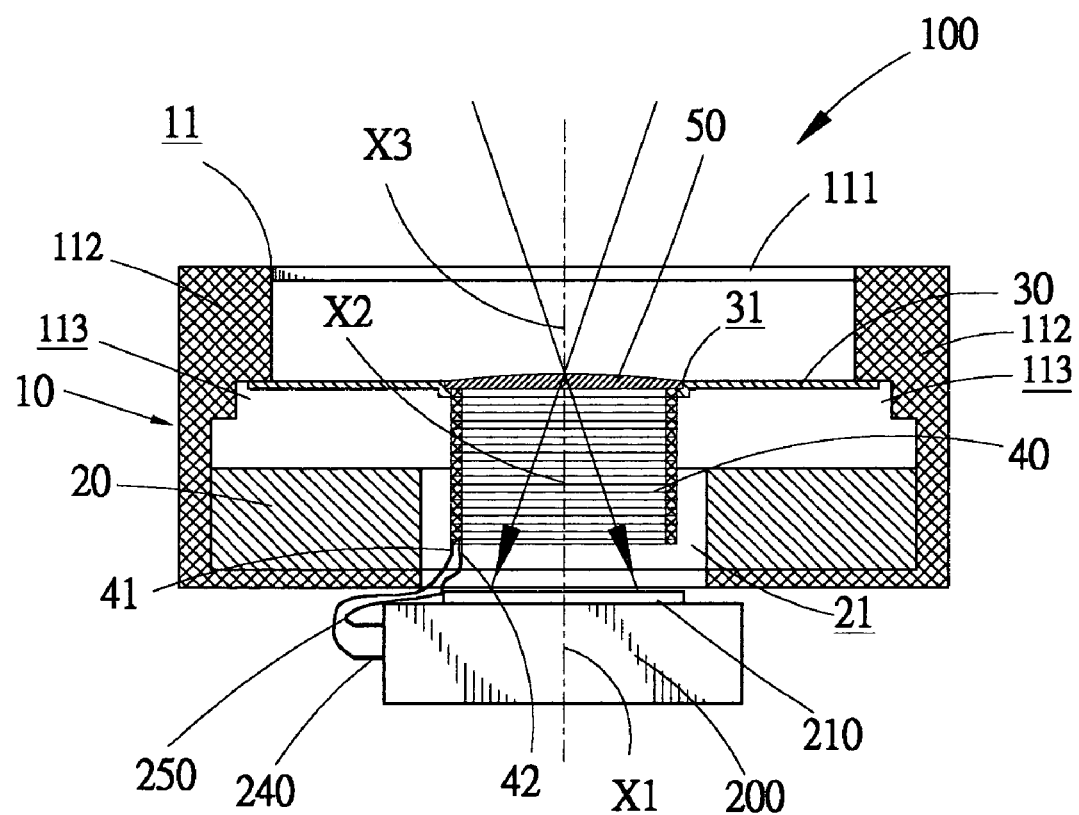
FIG. 6 is a cross-sectional view showing another application of the focusing module of the present invention in an imaging device.

With reference to FIG. 6, which shows a modification of the application illustrated in FIG. 5, the image-taking circuit 200 is now arranged outside the casing 10, rather than fixed at the bottom of the casing 10 as a unitary device shown in FIG. 5. The circuit 200 is arranged below the opening 12 of the casing 10 for receiving the optic signal from the lens 50. The outputs 220, 230 of the circuit 200 are coupled to the terminals 41, 42 of the movable magnetic element 40 by wires or conductors 240, 250 extending through the opening 12.

Figure 7:
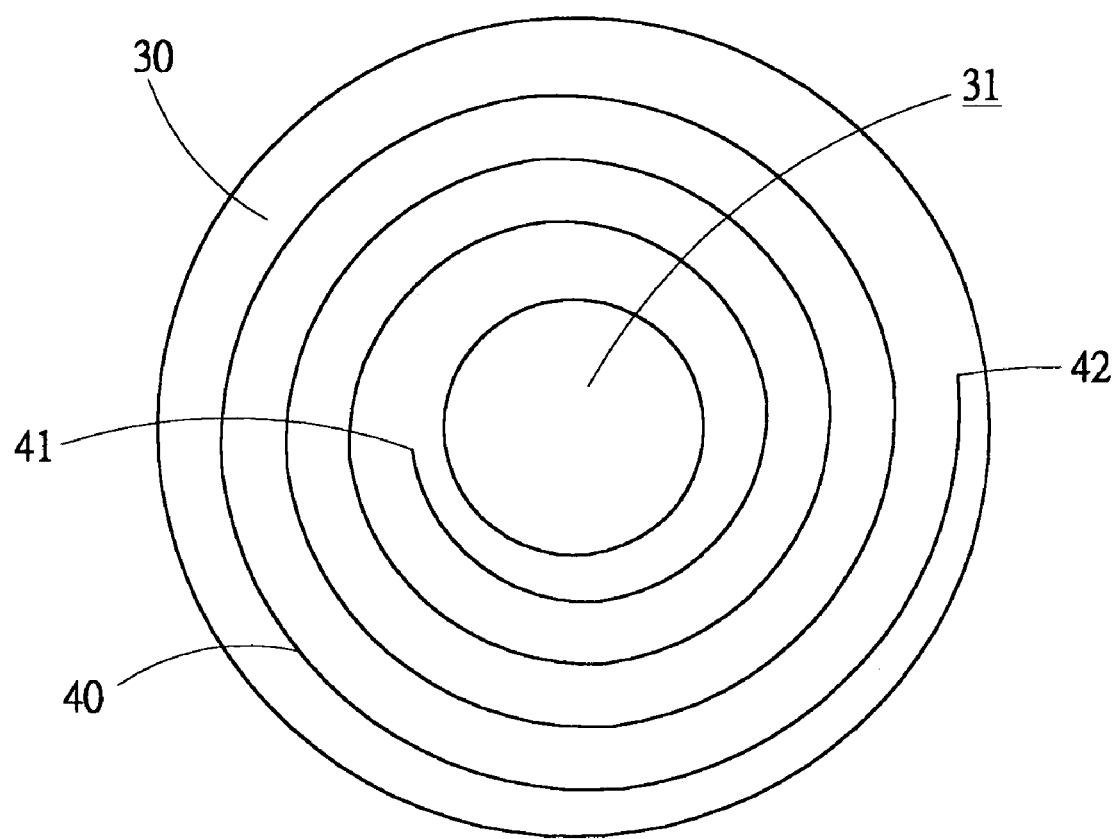
FIG. 7 is a plan view showing a membrane of the focusing module constructed in accordance with a second embodiment of the present invention.

FIG. 7 shows a focusing module in accordance with a second embodiment of the present invention, which is also designated with reference numeral 100 for simplicity. In the second embodiment of the focusing module 100, the membrane 30 is made of a flexible circuit board and the movable magnetic element 40 comprises conductive trace printed on the flexible circuit board. The conductive trace that constitutes the movable magnetic element 40 has two terminals 41, 42 that receive the control signals for generating the second magnetic field and thus effecting the same focusing operation as that described with reference to the first embodiment of the present invention.

Figure 8:
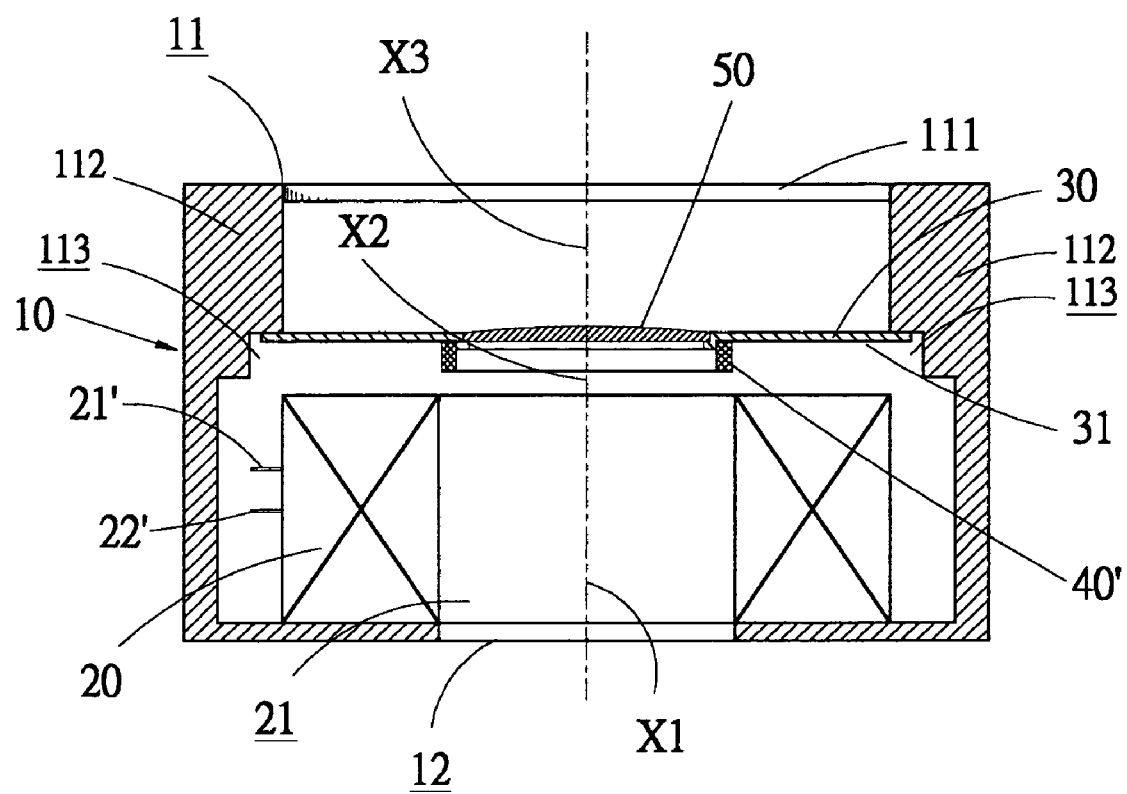
FIG. 8 is a cross-sectional view of a focusing module constructed in accordance with a third embodiment of the present invention.

FIG. 8 shows a focusing module in accordance with a third embodiment of the present invention, also designated with reference numeral 100 for simplicity. The focusing module 100 of the third embodiment comprises a fixed magnetic element 20' that comprises an electric coil or solenoid having two terminals 21', 22' that can be connected to control signal outputs 210, 220 of the image-taking circuit 200 shown in FIG. 5. The focusing module 100 also comprises a movable magnetic element 40', which comprises a ring magnet attached to the membrane 30 and surrounding the hole 31 of the membrane 30, and thus the lens 50 mounted to the hole 31. The fixed magnetic elements 20' selectively generates a first magnetic field that interacts with a second magnetic field generated by the ring magnet 40' thereby inducing an attraction force or expelling force between the magnetic elements 20', 40' to move the movable magnetic element 40' and thus the lens 50 upward or downward along the axis X3. The arrangement illustrated in FIG. 8 can be embodied in the focusing module shown in FIGS. 5 and 6 or that shown in FIG. 7.

Although the present invention has been described with reference to the preferred embodiments thereof, it is apparent to those skilled in the art that a variety of modifications and changes may be made without departing from the scope of the present invention which is intended to be defined by the appended claims.

What is claimed is:
1. A focusing module comprising:
a casing, defining an outer bore;
a fixed magnetic element fixed in the casing and generating a first magnetic field; said fixed magnetic element forming a substantially circumferential shape corresponding to the outer bore of the casing;
a resilient membrane received and retained in the outer bore and having a central hole therein; said central hole having a diameter less than the diameter of the outer bore;
a movable magnetic element directly mounted to an underside of the membrane and surrounding the central hole in a substantially concentric manner, the movable magnetic element generating a second magnetic field, which interacts with the first magnetic field of the fixed magnetic element to induce a force acting on the membrane to cause elastic deformation of the membrane; said membrane automatically returning to an un-deformed position upon removal of either said first or second magnetic field; and
a lens fixed to the central hole of the membrane whereby the lens is movable with respect to the casing due to the elastic deformation of the membrane caused by magnetic interaction between the first and second magnetic fields of the fixed and movable magnetic elements; said lens and movable magnetic element free of contact with the casing; said lens having a diameter substantially equivalent to the diameter of the central hole defined by the membrane.

2. The focusing module as claimed in claim 1, wherein the bore of the casing forms an opening of the casing and wherein a flat lens is received in and fixed to the opening of the bore; said flat lens having a diameter substantially equivalent to the diameter of the opening of the bore.

3. The focusing module as claimed in claim 1, wherein the bore of the casing is divided into upper and lower sections and wherein the membrane is received in the upper section.

4. The focusing module as claimed in claim 3, wherein the upper section of the bore forms a receiving slot that receives a circumference of the membrane.

5. The focusing module as claimed in claim 1, wherein an opening is formed in a bottom of the casing, serving as an output port for optical signal from the lens.

6. The focusing module as claimed in claim 1, wherein the fixed magnetic element comprises a ring magnet.

7. The focusing module as claimed in claim 1, wherein the fixed magnetic element forms a central bore.

8. The focusing module as claimed in claim 1, wherein the fixed magnetic element comprises a solenoid.

9. The focusing module as claimed in claim 1, wherein the fixed magnetic element has two input terminals for receiving control signals.

10. The focusing module as claimed in claim 1, wherein the membrane comprises a rubber membrane.

11. The focusing module as claimed in claim 1, wherein the membrane comprises a plastic membrane.

12. The focusing module as claimed in claim 1, wherein the membrane comprises a flexible circuit board.

13. The focusing module as claimed in claim 1, wherein the movable magnetic element comprises a coil.

14. The focusing module as claimed in claim 1, wherein the movable magnetic element has two input terminals for receiving control signals.

15. The focusing module as claimed in claim 1, wherein the movable magnetic element comprises conductive trace printed on the membrane.

16. The focusing module as claimed in claim 1, wherein the movable magnetic element comprises a ring magnet.

* * * * *